3,716,823
POLYCHROMATIC SONAR OBJECT IDENTIFICATION SYSTEM

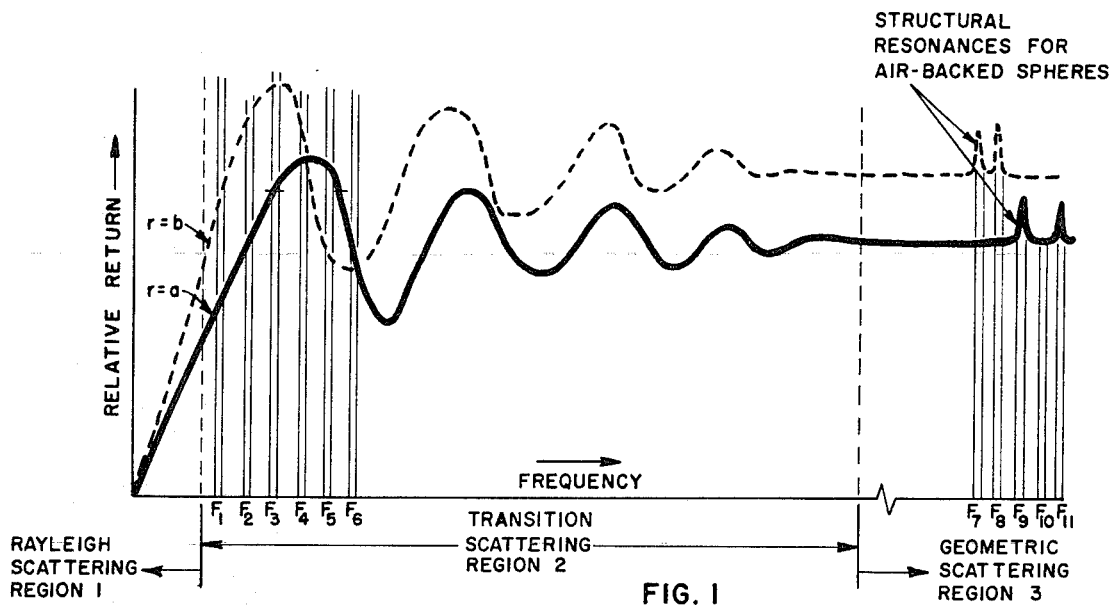
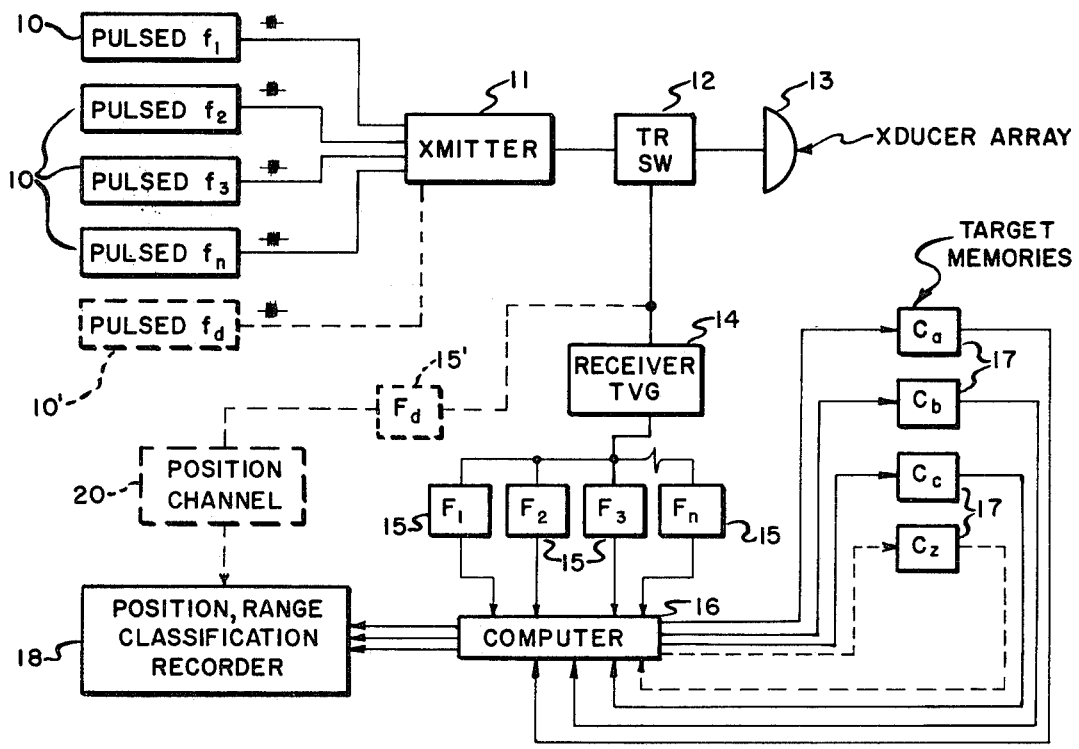
FIG. 1
FIG. 2
JOHN H. THOMPSON
DAVID S. SIMS
INVENTORS

John H. Thompson, Pittsburgh, Pa., and David S. Sims, Ellicott City, Md., assignors to the United States of America as represented by the Secretary of the Navy
Filed Dec. 15, 1960, Ser. No. 76,081
Int. Cl. G01s 9/66
U.S. Cl. 340—3 R                3 Claims The present invention relates to an identification system utilizing the frequency reflecting characteristics of an unidentified object and more particularly to an active catacoustic system for identifying underwater objects by determining their predominant back scattering frequency and the frequency at which resonance is established.

The rapid location and positive identification of underwater objects which becomes a necessity in certain military operations, such as mine hunting, is a difficult and rather perplexing problem. Attempted solutions to this problem range from various applications of conventional sonar equipment to actual physical inspection of the objects by underwater swimmers. Although present underwater sound systems are capable of resolving a target strength figure over the background level, it is known that the target strength is not necessarily proportional to the actual physical size of the target since a beer can for certain aspects may have a target strength in the order of that for a mine of say 18 inches in diameter and 6 feet long. The physical inspection technique by divers coupled with present sonar systems obviously provides positive identification but the time element involved and the large numbers of divers required can not be tolerated in most mine clearing operations.

An object of the invention is to provide a catacoustic system which will provide information directly related to the size of a minelike object.

Another object of the invention is to provide a catacoustic system which will provide information relative to the thickness of the shell of a minelike object.

Still another object of the invention is to provide a system with which objects can be classified as to size and located in range and bearing.

Other objects and advantages as well as the invention itself will become evident as the description of a preferred embodiment of the invention proceeds with reference to the drawing in which:

FIG. 1 shows back scattering differential as a function of frequency; and

FIG. 2 is a block diagram of a polychromatic system for practicing the invention.

The present invention utilizes a polychromatic underwater catacoustic system which is capable of determining the physical size of an unknown object as well as furnishing information as to the structural characteristics of the object, classification being based on a combination of size and structural characteristics.

The general problem of back scattering of a plane wave by a small sphere has been solved by Rayleigh, Theory of Sound, Macmillan Company (1937), vol. II, p. 283. Rayleigh shows that the intensity of sound reflected or back scattered by a small obstacle is a direct function of its size and an inverse function of the wavelength of the incident sound. When the scatterer has dimensions which are less than the wavelength of the sound, the target area or the acoustic cross-section of the scatterer is much less than the actual cross-section in a ratio which is roughly $(2\pi r/\lambda)^4$, $r$ being the radius of the scatterer and $\lambda$ the wavelength of the sound. The acoustic cross-section also depends on the density and elasticity of the object producing the scattering and the medium which in mine classification is most generally sea water.

Rayleigh's equation for the lower part of the curve for a heavy rigid sphere is $$\frac{\sigma}{1/4\pi d^2}=\frac{4}{9}\left(\frac{\pi d}{\lambda}\right)^4(C_0^2+3/4C_1^2)$$

where $\sigma$=target area (acoustic cross-section)
$d$=diameter of sphere
$\lambda$=wavelength of sound
$C_0$, $C_1$=constants depending on the density and elasticity of the particle which for iron are 0.99 and 0.81, respectively.

The value of the factor $$\frac{4}{9}(C_0^2+3/4C_1^2)$$

is not much different from unity for most substances. From Rayleigh's equation, it is evident that the scattering power of a small object is much more profoundly affected by its size and the wavelength of the sound. For 24 kc. sound, $\lambda$ may be considered to be 3 inches and hence a sphere greater than 30 inches in circumference will have a value of $\pi d/\lambda$ that is greater than 10 which the equation indicates will have a target area practically equal to its actual cross-section. For 24 kc. sound, Rayleigh's equation will apply only to spheres with a circumference of less than 3 inches. A simple calculation shows that the target area of a sphere 0.3 inch in circumference will be only one-millionth that of a sphere 3 inches in circumference. This is also the ratio of the sound power scattered by the two. A small sphere will scatter less sound of long wavelength than of short and the equation shows that a small solid sphere will scatter 10,000 times more sound of 24 kc. frequency than of 2.4 kc. frequency. This marked dependence on frequency is very characteristic of scattering by small objects.

The relative return due to back scattering is plotted in FIG. 1 as a function of frequency. This typical curve representing the variation of target area in the case of heavy rigid spheres can be plotted with the ordinant being the ratio of the acoustic cross-section to the actual cross-section and the abscissa being the ratio of the circumference of the target to the wavelength, or the abscissa may be $r/\lambda$ such as is shown in Radar Systems Engineering, Ridenour, MIT Radiation Laboratory Series Vol. I, first edition, McGraw-Hill (1947), p. 65, FIG. 3.1. The portions of the curve in FIG. 1, designated regions 1 and 2, may be computed from the calculations of V. C. Anderson "Journal Acoustical Society of America" 22:428 (1950). The two curves in FIG. 1 represent the back scattering function for two different sizes elastic spheres. In region 1 where the radius of the sphere is much smaller than a wavelength, the back scattering follows Rayleigh's law and is proportional to the fourth power of frequency. The back scattering in region 3, or geometrical scattering region, is independent of frequency and proportional to the physical size of a sphere. Region 2 is known as the transition region where the back scattering becomes a complicated function of frequency. In the case of physical objects with shapes other than that of a sphere, the back scattering closely approximates the behaviour of a sphere in the Rayleigh region and in the first portion of the transition region. Therefore, in region 1 and the first portion of region 2, practical targets can be treated as spheres; in the remaining portion of the transition region 2 and in the geometrical scattering region 3, practical targets can not be treated as spheres because the back scattering becomes a function of aspect angle. Most present sonar systems operate in the geometric scattering region 3 and this constitutes the basic reason for their incapability of satisfactorily classifying actual targets of mine size.

Again referring to FIG. 1, if one transmitted a polychromatic spectrum in the first portion of the transition region 2, say frequencies from $F_1$ to $F_6$, the size of the targets, say 1 of radius $a$ and 1 of radius $b$, could be resolved by the "color" or the relative amplitudes in the spectra of their returned echoes. Hence, size identification is dependent upon the nature of the spectra and not upon the amplitude of the return signal; and furthermore, the size determination is independent of aspects. Such a measurement provides the information necessary to separate mines from say tin cans but is not sufficient to separate say a large fish with an internal air cavity from a mine. This latter case can be covered by transmitting a polychromatic spectrum in the high frequency region 3 to check for body or case resonance, structural resonances being dependent upon the shell thickness and its acoustical impedance. In general, the return echo from the above mentioned type fish is primarily due to its air cavity and any resonances due to the thickness of the flesh between the water and the air cavity will be low Q because of the reasonably good acoustical impedance match between the flesh and the water. Man made objects will in general have a higher Q because of the higher impedance mismatch between their shells and the water and this is particularly true for objects which have sealed cavities within their structure. As a result, very pronounced resonances will exist for such objects. For example, in FIG. 1, if the two objects of radius $a$ and radius $b$ were spherical shells, they could be further identified by their respective structural resonances located in the frequency regions from $F_7$ to $F_{11}$. In the practical case, this means that a mine with its sealed cavity could be separated from a stone of the same physical size. It also means that a mine could be separated from a scrapped water backed oil drum or any air backed object of mine size that has a substantially different shell thickness.

In FIG. 1, the frequency of the first peak in the transition region 2 is given by the expression $$f_0 = \frac{1.07v}{2\pi r}$$

where $v$ is the velocity of sound in water and $r$ is the equivalent target radius. The upper and lower 3 db response points, taken from Ridenour's FIG. 3.1 referenced above, fall respectively at 1.12 and 0.716 times the frequency of the peak where $2\pi r/\lambda = 1.07$. Assuming a target radius of 1 foot and a 3 db detection resolution, the minimum required transmitting frequency coverage for size classification would range from 610 c.p.s. to 955 c.p.s. If the further assumption is made that the shell of a mine is made of ¼ inch thick steel, then the fundamental shell resonance will occur at 384 kc. and all supporting structures whose lengths are integral multiples of ¼ inch will exhibit resonances with overtones falling at this frequency. If the objects in question, such as mines, are known to have supporting structural members, say for example 1½ inches in length, the use of a band of frequencies in the neighborhood of 64 kc. would be indicated.

A polychromatic catacoustic system suitable for practicing the invention is shown in FIG. 2 as comprising an acoustic spectrum transmitter, a receiver for frequency analyzing the return spectrum and a computer for comparing the acoustic return with known target spectra stored in memory channels and displaying the probability of the return signal being that of a given type target. Although one would like to transmit a continuous polychromatic spectrum, the required practical system to accomplish this in conjunction with range resolving power would be difficult to realize and would be unnecessarily complicated. In fact, it is only necessary to transmit energy in a spectrum or series of spectra in which the desired information is expected to fall. This is accomplished in the apparatus shown in FIG. 2 by using $n$ number of RF pulse generators 10 at the required frequencies $f_1 \ldots f_n$ which are simultaneously triggered at a predetermined repetition rate which will depend upon the maximum range desired and the pulse width will depend upon two factors; one, the desired range resolution and two, the desired width of the spectra contributed by each pulse generator 10 to the overall transmitted spectrum. The pulse width of the several generators 10 need not necessarily be the same and in general the best "color" resolution can be realized if the pulse width at the lower frequencies are longer than those at the higher frequencies. The outputs from the RF pulse generators 10 drive a transmitter unit 11 which through a transmit-receive switch 12 energizes a transducer array 13 to transmit correspondingly pulsed acoustic energy.

As shown in FIG. 2, the same transducer array 13 used in transmission is also employed in reception of reflected signals which after conversion into corresponding electrical wave energy are fed through the TR switch 12 to a receiver 14 having time-varied-gain (TVG). Because of the frequency range of the system, the TVG section of the receiver 14 is preferably comprised of a number of channels in order to compensate for the differences in absorption in the various frequency bands. The TVG output of the receiver 14 may be analyzed in various ways known to the art to determine relative return in the several frequency bands for target identification. However, it is preferred to employ computer techniques to increase the speed and accuracy of identification. The output of the receiver 14 is fed in parallel to a plurality of band pass filters 15 each of which has a bandwidth that substantially covers the transmitted spectrum of their respectively associated RF pulse generators 10. These filters 15 constitute a bank of frequency analyzers, the voltage output of each of which is simultaneously fed to a computer 16, preferably of the digital type. The computer 16 compares its input from the frequency analyzers 15 with various target spectra stored in a plurality of memory channels 17 and computes the probability of the received signal being that from a given type target. The probabilities are fed to a classification recorder 18 for utilization in any of a number of forms ranging from digital display registers, cathode ray tube displays, electroluminescent displays to typing out the information on a digital readout typewriter.

The target library of memories stored in the memory channels 17 of the computer 16 may be obtained from model studies or where desired from measurements or recordings made on prototype models. More specifically the target library may be obtained by recording values corresponding to the signal waveforms representative of the acoustic wave spectra returned by known individual mines and appearing at the outputs of the filters 15. In order to better understand how target classification is accomplished, it will be assumed that some target, $a$, is located within the range of the system. A transmitted spectrum is propagated by the transducer array 13 and returned as an echo, the frequencies of which are resolved by the frequency analyzer channels 15. The outputs of the analyzers 15 which are fed to the computer 16 can be expressed in the form of an $n$-dimensional linear expression such as $$K_a(a_1F_1 + a_2F_2 + a_3F_3 + \ldots a_nF_n)$$

where the outputs of the channels 15 are $K_a a_1$ for channel $F_1$, $K_a a_2$ for channel $F_2$, etc. The value of $K_a$ is not important because only the relative rather than the absolute values of the channel coefficients are needed. The ratios of the coefficients of the channels 15 are important in the low frequency or size determinant region whereas the existence of the coefficients with values greater than a predetermined threshold level is important in the high frequency or structural resonant region (see FIG. 1). These latter coefficients can also be expressed in the form of ratios of this threshold level. The digital computer 16 compares the outputs from the analyzers 15 with predetermined target classifications stored in the memory channels 17 and chooses the most probable classification for any incoming echo for all ranges within the repetition period. The output of the computer 16, which includes target classification and range as a function of time, is fed to the recorder 18 which as above indicated furnishes a suitable presentation of the function.

When a target of interest has been classified, the only information with respect to the target's location present in the system thus far described is that of range and approximate direction. Further target position information may be obtained in any well known manner by separate equipment or it can be included in the classification system as indicated in FIG. 2 by broken lines. As here shown, an additional generator 10' transmits an RF pulse at some center frequency $f_d$ on a separate transducer in the array 13 simultaneously with the transmission of the frequency spectrum from the generators 10. The return from such center frequency $f_d$ is passed by a filter 15' through a position channel 20 to the recorder 18, position being determined by lobing techniques or as otherwise desired. The frequency chosen for the pulse generator 10' for determining position will of course be such that it will not interfere with target classification and in the present case may be in the ordinary sonar range, say 5 kc. to 15 kc. When two or more of the classification systems are utilized for monitoring shipping channels where broad azimuth coverage is desired, the target position can be determined by triangulation with adjacent systems by measuring the time-of-arrival of the acoustic signal at each location. The time-of-arrivals determine the range from each location to the target and with knowledge of the positions of the several systems the target position can be determined by the intersection of the range arcs either graphically or by the computer. This obviously eliminates the need for the positioning determining components 10', 15' and 20 indicated in FIG. 2.

It will be evident from the foregoing that the system of the invention will furnish rapid classification of underwater objects and is particularly applicable to the somewhat frustrating field of mine countermeasures. A shipborne system will considerably increase the effectiveness of minehunting operations as a result of its speed of classification of minelike objects. Fixed installations, whether on shore or platforms, of the system of the invention are very effective for channel watching operations in which it is desired to determine if, when and where a mine has been dropped or planted in the water.

While for the purpose of disclosing the invention a specific embodiment thereof has been described in detail, it will be evident to those skilled in the art that various modifications may be made and that equivalent apparatus may be devised for practicing the invention, the scope of which is defined in the appended claims.

What is claimed is:

1. Apparatus for determining whether an underwater object is mine-like in size and construction comprising means for transmitting toward said object acoustic waves in one spectrum having wavelengths extending over the range of circumferential dimensions of expected mines and in another spectrum having wavelengths extending over the range of twice the case thicknesses of expected mines, means for deriving an unknown signal waveform representative of the acoustic wave spectrum back-scattered by said object, and a computer including memory channels in which is stored a library of known signal waveforms representative of the acoustic wave spectra returned by known mines for comparing said unknown signal waveform with said known signal waveforms and producing an output signal indicating the result of the comparison.

2. Means for determining the circumference of an underwater sonar target within a selected range of circumferences comprising, in combination, means for transmitting toward said target a spectrum of pulses of acoustic energy having wavelengths equal to various circumferences distributed over said selected range, means for receiving the return echo pulses reflected by said target, and a plurality of band pass filter circuits connected with said receiving means, each of said filters being responsive only to a different one of said pulses in the transmitted spectrum and producing an output signal proportional to the amplitude thereof, whereby the wavelength of the echo pulse having the largest amplitude is a measure of the circumference of said target.

3. The combination according to claim 2 including means for applying the outputs of said filter circuits to a matching operation to determine whether the distribution of their relative amplitudes coincide with any one of a group of stored amplitude distributions representative of progressively different known targets.

References Cited

UNITED STATES PATENTS

| | | | |
|---|---|---|---|
| 1,504,247 | 8/1924 | Jacques | 340—6 |
| 2,499,459 | 3/1950 | Carlin | 340—6 |
| 2,822,536 | 2/1958 | Sandretto | 343—11 |

FOREIGN PATENTS

| | | | |
|---|---|---|---|
| 816,119 | 7/1959 | Great Britain | 340—3 |

RICHARD A. FARLEY, Primary Examiner

U.S. Cl. X.R.

343—5 SA